United States Patent
Oh et al.

(10) Patent No.: US 9,763,161 B2
(45) Date of Patent: Sep. 12, 2017

(54) APPARATUS OF CONTROLLING CONNECTION FOR USER EQUIPMENT AND METHOD OF CONTROLLING ACCESS FOR USER EQUIPMENT

(71) Applicant: ELECTRONICS AND TELECOMMUNICATIONS RESEARCH INSTITUTE, Daejeon (KR)

(72) Inventors: Don Sung Oh, Daejeon (KR); Ho Young Song, Daejeon (KR); Yeong Jin Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/609,482

(22) Filed: Jan. 30, 2015

(65) Prior Publication Data
US 2015/0230148 A1 Aug. 13, 2015

(30) Foreign Application Priority Data
Feb. 13, 2014 (KR) ........................ 10-2014-0016331

(51) Int. Cl.
*H04W 36/00* (2009.01)
*H04W 36/32* (2009.01)
*H04W 64/00* (2009.01)
*H04W 36/04* (2009.01)

(52) U.S. Cl.
CPC ......... *H04W 36/32* (2013.01); *H04W 64/006* (2013.01); *H04W 36/04* (2013.01)

(58) Field of Classification Search
CPC .... H04W 36/32; H04W 64/006; H04W 36/04
USPC ......................................................... 455/444
See application file for complete search history.

(56) References Cited

U.S. PATENT DOCUMENTS

| 8,520,639 | B2 | 8/2013 | Choi | |
|---|---|---|---|---|
| 2008/0075056 | A1* | 3/2008 | Thome | H04W 64/006 370/342 |
| 2011/0283011 | A1* | 11/2011 | Li | H04L 12/14 709/231 |
| 2012/0034917 | A1* | 2/2012 | Kazmi | H04W 48/16 455/434 |
| 2012/0264455 | A1* | 10/2012 | Yasuoka | H04L 67/1002 455/456.2 |

(Continued)

FOREIGN PATENT DOCUMENTS

KR 1020130086587 A 8/2013

OTHER PUBLICATIONS

Byungjin Jeong, et al; "A Novel Handover Decision Algorithm to Avoid Unnecessary Handovers in Hierarchical Macro/Femto-Cell Networks", Journal of KIISE; ISSN: 1226-2315 @ 1229-7720@; vol. 39, No. 5, pp. 420-434; May 2012.

*Primary Examiner* — Shahriar Behnamian
(74) *Attorney, Agent, or Firm* — Ladas & Parry LLP (57) ABSTRACT

The present invention provides a terminal connection control apparatus, including: a cell position determining unit which provides information on a cell in which a terminal is located; a requested data speed determining unit which figures out a data speed requested by the terminal; and a connection cell control unit which controls a connection cell of the terminal based on cell position information and the requested data speed.

15 Claims, 4 Drawing Sheets

(56) References Cited

U.S. PATENT DOCUMENTS

| | | | |
|---|---|---|---|
| 2013/0225171 A1 | 8/2013 | Singh et al. | |
| 2013/0272129 A1* | 10/2013 | Prakash | H04W 28/0221 370/235 |
| 2014/0141785 A1* | 5/2014 | Wang | H04W 36/32 455/441 |
| 2014/0179324 A1* | 6/2014 | Lee | H04W 52/244 455/437 |
| 2014/0242989 A1* | 8/2014 | Cai | H04W 52/54 455/436 |
| 2014/0302853 A1* | 10/2014 | Militano | H04W 36/0055 455/436 |
| 2015/0181373 A1* | 6/2015 | Xie | H04W 4/02 455/406 |
| 2015/0257048 A1* | 9/2015 | Morioka | H04W 36/0055 370/331 |
| 2015/0373600 A1* | 12/2015 | Malkamki | H04W 48/20 370/331 |
| 2015/0373613 A1* | 12/2015 | Harris | H04W 36/22 370/331 |

* cited by examiner

APPARATUS OF CONTROLLING CONNECTION FOR USER EQUIPMENT AND METHOD OF CONTROLLING ACCESS FOR USER EQUIPMENT

CROSS-REFERENCE TO RELATED APPLICATIONS

This application claims priority to and the benefit of Korean Patent Application No. 10-2014-0016331 filed in the Korean Intellectual Property Office on Feb. 13, 2014, the entire contents of which are incorporated herein by reference.

TECHNICAL FIELD

The present invention relates to a terminal connection control apparatus and a terminal connection control method, and more particularly, to a terminal connection control apparatus and a terminal connection control method which control connection of terminals based on a cell where the terminal is located and a data speed required for the terminal.

BACKGROUND ART

The mobile terminal may not receive a service at a sufficient data speed in a metro area or a traffic congested area in a mobile communication environment for the sake of a macro cell. Therefore, a method which builds a multilayered cell environment in which a small cell and a macro cell coexist to simultaneously accept a large amount of traffic has been suggested in order to solve a problem of a traffic congested area.

SUMMARY OF THE INVENTION

The present invention has been made in an effort to provide a terminal connection control apparatus and a terminal connection control method which determine a connection cell to which a terminal is connected in accordance with a movement speed which is figured out in accordance with a position of the terminal and a service feature requested by the terminal, in a multilayered cell communication environment in which a small cell overlapping a macro cell exists.

Technical objects of the present invention are not limited to the aforementioned technical objects and other technical objects which are not mentioned will be apparently appreciated by those skilled in the art from the following description.

An embodiment of the present invention provides a terminal connection control apparatus, including: a cell position determining unit which provides information on a cell in which a terminal is located; a requested data speed determining unit which figures out a data speed requested by the terminal; and a connection cell control unit which controls a connection cell of the terminal based on the cell position information and the requested data speed.

Another embodiment of the present invention provides a method for controlling connection of a terminal in a multilayered cell environment which is configured by a macro cell and a small cell overlapping the macro cell, including: figuring out a cell in which the terminal is located; figuring out a speed of data requested by the terminal; and controlling a connection cell of the terminal based on the cell position information and the requested data speed.

The terminal connection control apparatus and the terminal connection control method according to embodiments of the present invention determine the handover not only by a movement speed but also by figuring out a time when the terminal stays in a specific cell so that unnecessary handover is not performed when the terminal passes a small cell.

The terminal connection control apparatus and the terminal connection control method according to embodiments of the present invention determine a connection cell not only based on a time when the terminal stays in a specific cell but also based on a service feature which is requested by the terminal so that even though the terminal stays in a small cell, when fast data speed is not requested or a service which requests mobility control needs to be provided, the connection to the macro cell may be maintained.

While the embodiments of the present invention have been described for illustrative purposes, it should be understood by those skilled in the art that various changes, modifications, substitutions, and additions may be made without departing from the technical spirit and scope of the present invention as defined in the appended claims.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, embodiments of the present invention will be described in detail with reference to the accompanying drawings. Like elements in the drawings are denoted by like reference numerals and a redundant description thereof will be omitted.

Specific structural and functional descriptions of the embodiments of the present invention which are disclosed in the specification are illustrated only for description of the embodiments of the present invention and the embodiments of the present invention may be carried out by various types but it is not interpreted that the present invention is limited to the embodiments described in the specification.

In describing components of the embodiment of the present invention, terminologies such as first, second, A, B, (a), (b), and the like may be used. However, such a terminology is used only to distinguish a component from the other components but a nature or an order of the component is not limited by the terminology.

Figure 1:
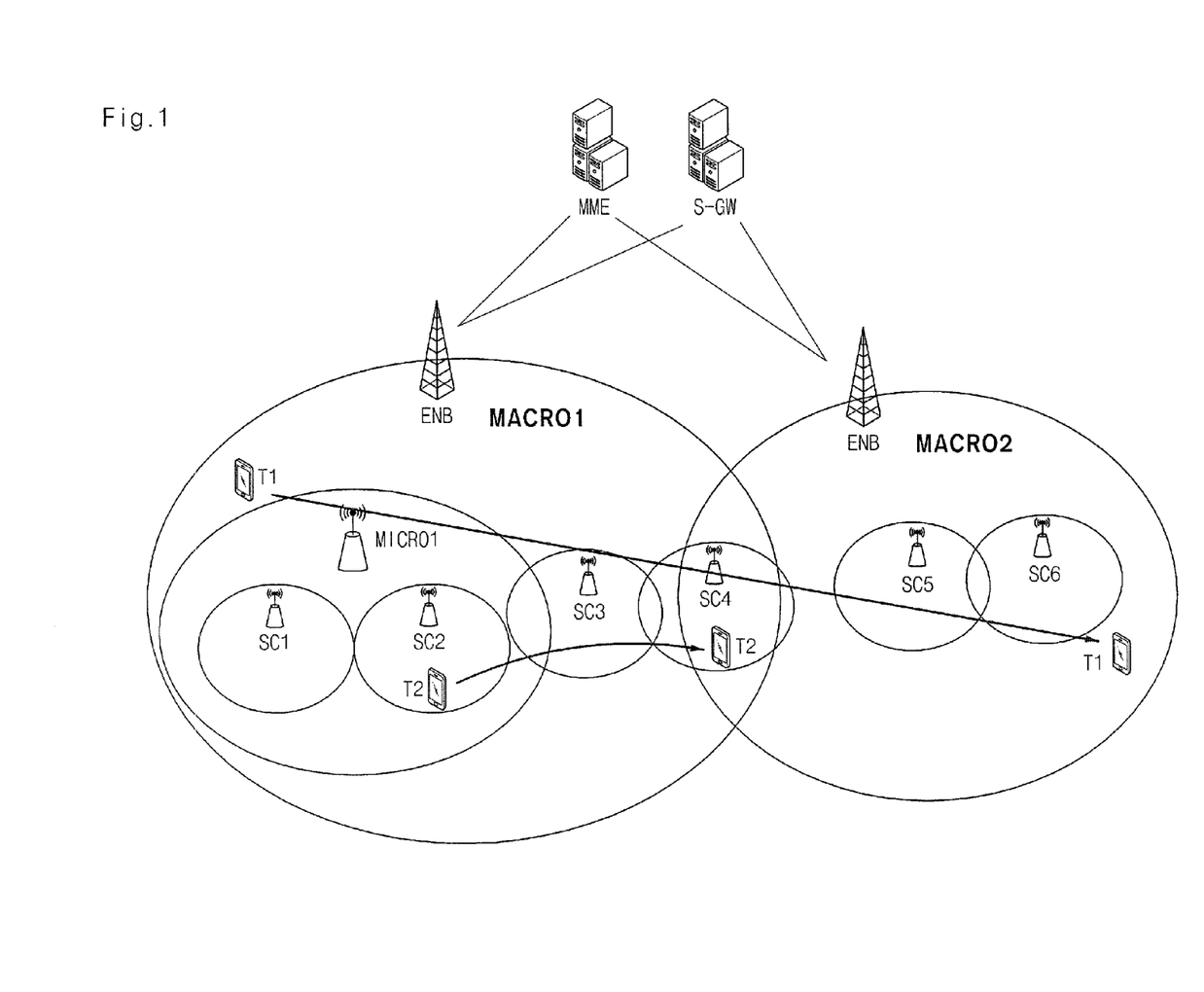
FIG. 1 is a view illustrating a multilayered cell environment to which a terminal connection control apparatus and a terminal connection control method according to embodiments of the present invention are applied.

FIG. 1 is a view illustrating a multilayered cell environment to which a terminal connection control apparatus and a terminal connection control method according to embodiments of the present invention are applied.

Referring to FIG. 1, a macro cell base station ENB which controls a macro cell is connected to an MME (mobility management entity) which manages wireless network interworking and an SGW (serving gateway) which interworks with the base station.

Small cells are located in a shadow area in order to expand a service coverage between macro cells. Generally, the small cell includes a femto cell which is provided indoor such as home and a pico cell which is provided in an indoor hot spot such as a coffee shop or a restaurant in accordance with the coverage. The small cell may include a micro cell in broad concept.

The small cell, the micro cell, and the macro cell may use the same or different frequency bands and have different bandwidths to be used. Further, a small cell base station, a micro cell base station, and a macro cell base station may use different RATs (radio access technologies).

The small cell and the micro cell may be connected to the same or different MMEs or mobility thereof may be or may not be controlled.

Referring to FIG. 1, in a first macro cell MACRO1, a first micro cell MICRO1 and first to fourth small cells SC1 to SC4 are located. Further, the first and second small cells SC1 and SC2 are included in a coverage of the first micro cell MICRO1. As described above, in a multilayered cell environment, small cells overlap in the macro cell.

Fourth to sixth small cells SC4, SC5 and SC6 are located in the second macro cell MACRO2. The fourth small cell SC4 is located in a region where the first macro cell MACRO1 and second macro cell MACRO2 overlap.

Generally, a terminal is connected to a specific base station based on a signal output from each base station which is received in the terminal. If a first mobile terminal T1 moves from the first macro cell MACRO1 to the second macro cell MACRO2, the first mobile terminal T1 may be connected to all the first micro cell MICRO1, the third small cell SC3, the fourth small cell SC4, the fifth small cell SC5, and the sixth small cell SC6. However, as such, when a handover frequently occurs, a power of the terminal is significantly consumed and it is hard to control a traffic load in each base station.

Accordingly, a handover timing or a cell to be connected needs to be determined by figuring out an actual movement speed of the first mobile terminal T1. For example, when the first mobile terminal T1 rapidly moves, only a handover from the first macro cell MACRO1 to the second macro cell MACRO2 is enough.

In the embodiment of the present invention, if a time when the first mobile terminal T1 maintains the connection with the first macro cell MACRO1 does not exceed a predetermined time, the first mobile terminal T1 does not try to connect to other small cells. Therefore, when the first mobile terminal T1 rapidly moves, even though a strength of a signal of the small cells is large, the handover is not performed.

Even when the first mobile terminal T1 maintains the connection with the first macro cell MACRO1 for the predetermined time or longer, if the first mobile terminal T1 does not stay in the small cell or the micro cell for the predetermined time or longer, the first mobile terminal T1 does not try to connect to the small cell or the micro cell.

Even though the first mobile terminal T1 maintains the connection with the first macro cell MACRO1 for the predetermined time or longer and stays in the fourth small cell SC4 for the predetermined time or longer, if a data speed which is requested by the first mobile terminal T1 is slower than a predetermined speed, the first mobile terminal T1 may not try to connect to the small cell. Further, only when the data speed requested by the terminal is slower than a data speed which may be provided by a base station which controls the fourth small cell SC4, the terminal may try to connect to the fourth small cell SC4. If the first mobile terminal T1 does not request a fine mobility but requests a data transmission service at a predetermined speed or faster, the first mobile terminal T1 may try to connect to the fourth small cell SC4.

The second mobile terminal T2 moves from the second small cell SC2 to the fourth small cell SC4, so that if the movement speed is fast, the second mobile terminal T2 is not connected with the third small cell SC3 but may be connected from the second small cell SC2 directly to the fourth small cell SC4. However, if the movement speed of the second mobile terminal T2 is slow, the connection with the third small cell SC3 may be necessary.

However, if the connection of the terminal is controlled only based on the movement speed, when the speed is slow, it is difficult to determine the cell connection if all terminals are connected to the small cells so that a plurality of cells is located in a predetermined area. Further, many terminals are connected to one small cell so that a speed of data which is actually provided may be reduced.

Therefore, in the terminal connection control apparatus and the terminal connection control method according to the embodiments of the present invention, even though a position of the terminal, specifically, a cell in which the terminal is located and a time when the terminal stays are figured out and the terminal is located in a specific cell, a cell to be connected is determined depending on a data speed which is requested by the terminal.

Figure 2:
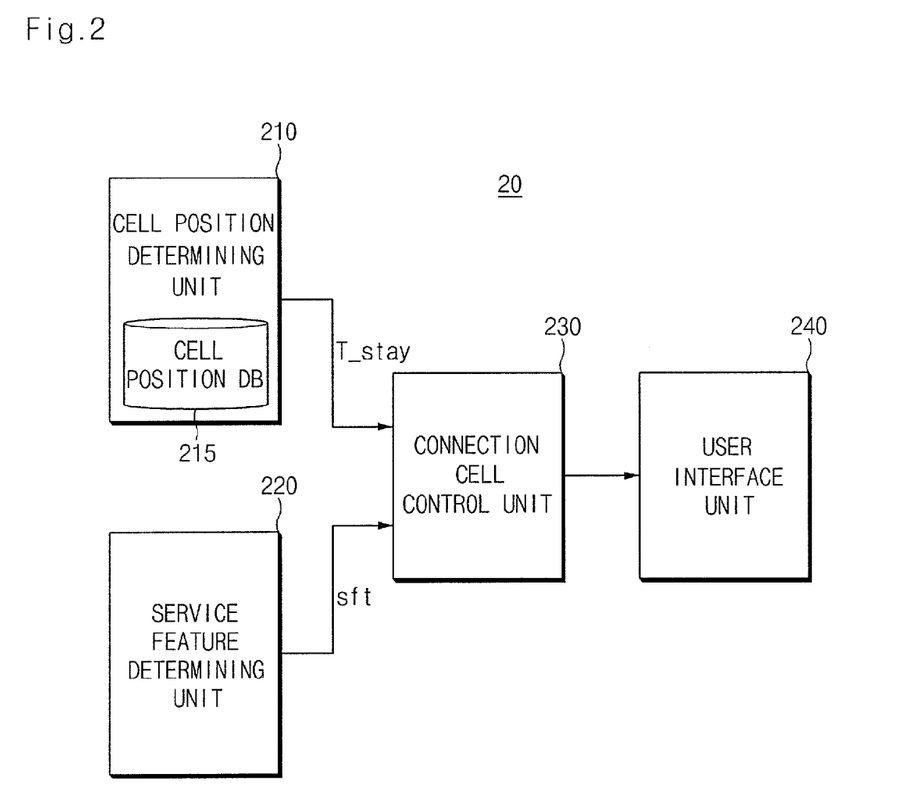
FIG. 2 is a block diagram illustrating a terminal connection control apparatus according to an embodiment of the present invention.

FIG. 2 is a block diagram illustrating a terminal connection control apparatus according to an embodiment of the present invention.

Referring to FIG. 2, the terminal connection control apparatus 20 may include a cell position determining unit 210, a service feature determining unit 220, and a connection cell control unit 230.

The cell position determining unit 210 determines a cell in which a terminal is currently located. For example, the cell position determining unit 210 may determine a position of the terminal using a means such as a GPS. The cell position determining unit 210 may determine the position of the terminal at a predetermine interval and figure out cells to which a terminal is connectable based on the determined position to obtain information on a cell in which the terminal is located and figure out a time when the terminal stays in the cell.

The cell position determining unit 210 may generate a macro cell maintaining time T_m and a small cell maintaining time T_s based on the time when the terminal stays in the cell to provide the times to the connection cell control unit 230. In FIG. 2, the maintaining times for the cells are collectively denoted by "T_stay".

In some embodiments, the cell position determining unit 210 may include a cell position database 215. The cell position database 215 may accumulatively store a specific cell and a time when the terminal stays in the specific cell. The cell position database 215 may store times in regards to one or more cells, respectively. The cell position database 215 may store the maintaining time of the cell, that is, time while the terminal is in the specific cell, and the number of times the cell is in the specific cell.

For example, when the terminal enters a cell which is located in a location such as a home, a school, or an office where a user frequently visits, the terminal is expected to stay in the small cells for a long time. Accordingly, when the terminal which is connected to the macro cell moves to the small cell, even though the time when the terminal stays in the small cell is within a predetermined time, the terminal connection control apparatus 20 may switch the connection to the small cell based on a previous record when the user stays in the small cell for a long time.

The service feature determining unit 220 figures out a current service feature (sft) for the terminal to provide the service feature to the connection cell control unit 230. According to the embodiment, the service feature determining unit 220 may determine a service feature (sft) based on an application program which is being executed in the terminal. For example, the service feature (sft) may include a data speed which is requested for the current service and information indicating whether to require to control a mobility for the current service.

The connection cell control unit 230 may control a connection cell of the terminal based on the cell position information and the service feature (sft). The connection cell control unit 230 figures out a position where the terminal currently stays for a predetermined time and a cell to which the terminal is currently connectable, through the cell position determining unit 210. Further, the connection cell control unit 230 receives data speed information which may be provided from a base station which controls cells to which the current terminal is connectable to figure out a data speed which may be provided by the cells.

The connection cell control unit 230 may determine the connection cell of the terminal by different methods depending on the type of the cell to which the terminal is currently connected.

The connection cell control unit 230 determines whether the connection to the small cell is appropriate when the terminal is being connected to the macro cell and determines whether the connection to the macro cell is appropriate when the terminal is being connected to the small cell. This is because conditions to switch the connection to the cells are different.

When the terminal is being connected to the macro cell, if the small cell maintaining time T_s which is received from the cell position determining unit 210 is equal to or longer than the predetermined time, the connection cell control unit 230 determines whether the terminal is appropriate for the connection to the small cell and then controls the terminal to be connected to the small cell.

When the terminal is being connected to the macro cell, even though the small cell maintaining time T_s is equal to or longer than the predetermined time, the connection cell control unit 230 controls the terminal to be connected to the small cell depending on the characteristic of the application program which is being used in the terminal, that is, the provided service feature sfc and the data speed which may be provided by the small cell to be connected.

The service feature (sft) of the terminal may include the data speed which is requested for the terminal and whether to control the mobility for the provided service. For example, when the service which is being used in the terminal is a mobile communication service such as voice call or video call, a fine mobility is requested so that it is determined that the terminal is not appropriate for the small cell connection to allow the terminal to maintain the macro cell connection. Further, when video data in which an application program which is being used in the terminal requests a significant data speed is received, the terminal is allowed to maintain the small cell connection.

When the service which is being used in the terminal requests a high data speed but does not request a fine mobility and the small cell to be mobile-connected sufficiently provides a data speed which is requested for the terminal, the connection cell control unit 230 determines that the terminal is appropriate for the small cell connection.

That is, when too many terminals are connected to the small cell so that the data speed which is requested by the terminal is not satisfied, a desired data speed may not be achieved even with the small cell connection. Therefore, even though the terminal wants to connect to the small cell, if the small cell does not provide the speed which is requested by the terminal, there is no reason to connect to the small cell. Therefore, when the terminal wants to connect to a specific small cell, the terminal receives data speed information which may be provided from the base station which controls the small cell to determine whether to connect to the small cell.

The connection cell control unit 230 receives the data speed information which may be provided from the small cell base station and only when a requested data speed of the terminal is slower than a data speed which may be provided by the base station, that is, the small cell may provide the data speed requested by the terminal, the terminal is connected to the small cell.

According to the embodiment, in the specification it is described that a case when the number of times when the terminal is located in the small cell during a predetermined time or longer is equal to or larger than a predetermined number of times is also included in a concept that the small cell maintaining time T_s is equal to or longer than a predetermined time.

The connection cell control unit 230 periodically exchanges data with the cell position determining unit 210 and when the small cell maintaining time Ts is equal to or longer than the predetermined time or the terminal enters the small cell, the connection cell control unit 230 deducts previous maintaining times of the small cell from the cell position database 215, thereby determining in advance whether the terminal stays in the small cell for a long time.

Therefore, if the terminal is expected to stay in the small cell for a long time, the terminal is connected to the small cell in advance before the predetermined time has elapsed, so that the delay of the connection to the small cell does not occur.

In another embodiment, when the terminal enters the small cell, the connection cell control unit 230 figures out a characteristic of the small cell which the terminal enters. When the small cell which the terminal enters is a mobile small cell which is provided by public transportation means, the terminal is connected to the mobile small cell before a predetermined time elapses since the terminal enters the small cell.

According to an embodiment, even though the data speed (dsp) requested by the terminal is not larger than the predetermined speed, if the terminal is expected to stay in the small cell for a significantly long time, the terminal may be controlled to be connected to the small cell.

While the terminal is being connected to the small cell, the connection cell control unit 230 may determine a handover condition to control the terminal to be connected to the macro cell or another small cell. For example, according to the handover condition, a case when a strength of an output signal which is received from the base station of the macro cell or another small cell is larger than that of a base station of the small cell to which the terminal is currently connected may be included. In another embodiment, when the data service requested by the terminal requests fine mobility control, the terminal may be connected to the macro cell.

The terminal connection control apparatus 20 according to an embodiment of the present invention may further include a user interface unit 240.

The user interface unit 240 may receive the order of priority of the connection cell to which the terminal tries to connect from the user. For example, the user interface unit 240 may be connected to a receiving means from the user and an outputting means to the user.

The connection cell control unit 230 may determine the connection cell based on the order of priority which is received from the user interface unit 240.

Figure 3:
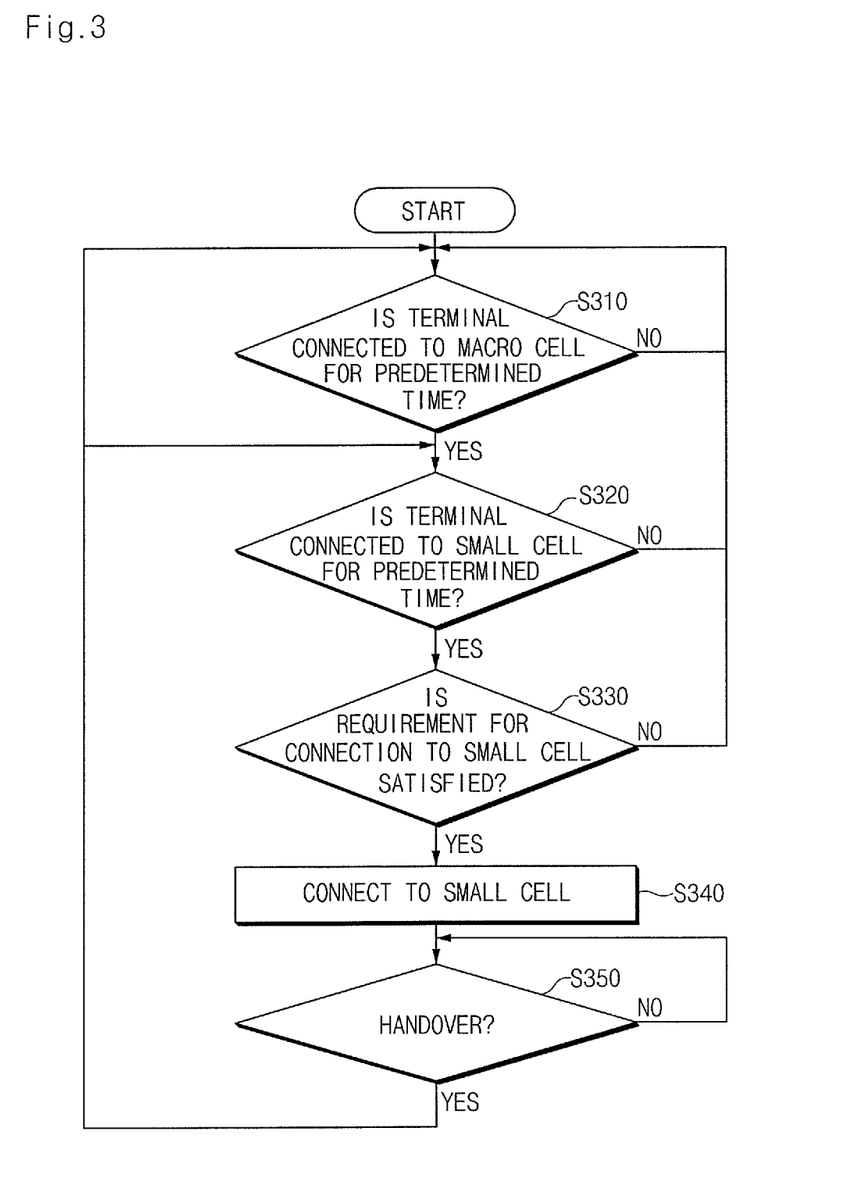
FIG. 3 is a flow chart illustrating a terminal connection control method according to an embodiment of the present invention.

FIG. 3 is a flow chart illustrating a terminal connection control method according to an embodiment of the present invention.

Referring to FIG. 3, the cell position determining unit 210 in the terminal connection control apparatus 20 figures out a cell in which the terminal is located and provides the maintaining time T_stay in the cell to the connection cell control unit 230.

The connection cell control unit 230 determines whether the terminal is connected to the macro cell for a predetermined time or longer in step S310. In FIG. 3, first, the following description is made on the assumption that the terminal is connected to the macro cell.

When the terminal is connected to the macro cell for a predetermined time or longer (Yes in step S310), it is determined whether the terminal is capable of being connected to the small cell. The connection cell control unit 230 of the terminal determines whether the terminal stays in the small cell for the predetermined time or longer (Yes in step S320), based on the maintaining time T_stay received from the cell position determining unit 210.

As described above, a case when the terminal stays in the small cell for the predetermined time or longer may include a case the number of times when the terminal is located in the small cell for the predetermined time or longer is equal to or larger than a predetermined number of times. The case may be determined be deriving previous information of the cell and the terminal from the cell position database 215 after the terminal enters the small cell.

When the terminal which is connected to the macro cell stays in the small cell for the predetermined time or longer (Yes in step S320), it is determined whether to satisfy requirements for connecting to the small cell in step S330.

The requirements for small cell connection may include a case when a requested data speed is equal to or higher than a predetermined speed or a case when the fine mobility control is not required in accordance with the feature (sft) of the service which is performed in the terminal. The requirements for small cell connection may also include whether the small cell which is allowed to be connected is capable of providing a data speed which is equal to or higher than the data speed requested by the terminal.

When at least some of requirements for small cell connection are satisfied (Yes in step S330), the connection cell control unit 230 may control the terminal to be connected from the macro cell to the small cell in step S340.

As a result of the determination in the connection cell control unit 230, if the requirements for small cell connection are not satisfied (No in step S330), the terminal continuously maintains the connection to the macro cell. Thereafter, when the terminal is located in the small cell for the predetermined time while maintaining the connection to the macro cell, it is determined again whether to satisfy the requirements for small cell connection, so that the terminal is controlled to be connected to the small cell.

In a status when the terminal is connected to the small cell, it is determined whether to satisfy the handover condition in step S350. A case when the handover condition is satisfied may include a case when the terminal gets out of the small cell, a case the strength of the signal satisfies the handover condition, a case when the data service speed of the small cell is slower than the data speed requested by the terminal, and a case when a service having a strict mobility control needs to be provided.

Accordingly, at least one of the above conditions is satisfied (Yes in step S350), the connection cell control unit 230 controls the terminal to be connected to the macro cell or another small cell. When the terminal is handed over to the macro cell, the sequence returns to step S310 and when the terminal is handed over to another small cell, the sequence returns to step S320 to repeat the above-described steps.

When the handover condition is not satisfied (No in step S350), the terminal may continuously determine whether to satisfy the handover condition while maintaining the connection to the small cell.

The terminal connection control apparatus and the terminal connection control method according to the embodiments of the present invention may consider a time when the terminal stays in a specific cell and characteristics of the macro cell and the small cell when the connection to the small cell which is located in the macro cell is controlled.

Accordingly, the connection is controlled in consideration of a movement speed of the terminal and a data service speed requested by the terminal together so that the connection may be efficiently managed.

Figure 4:
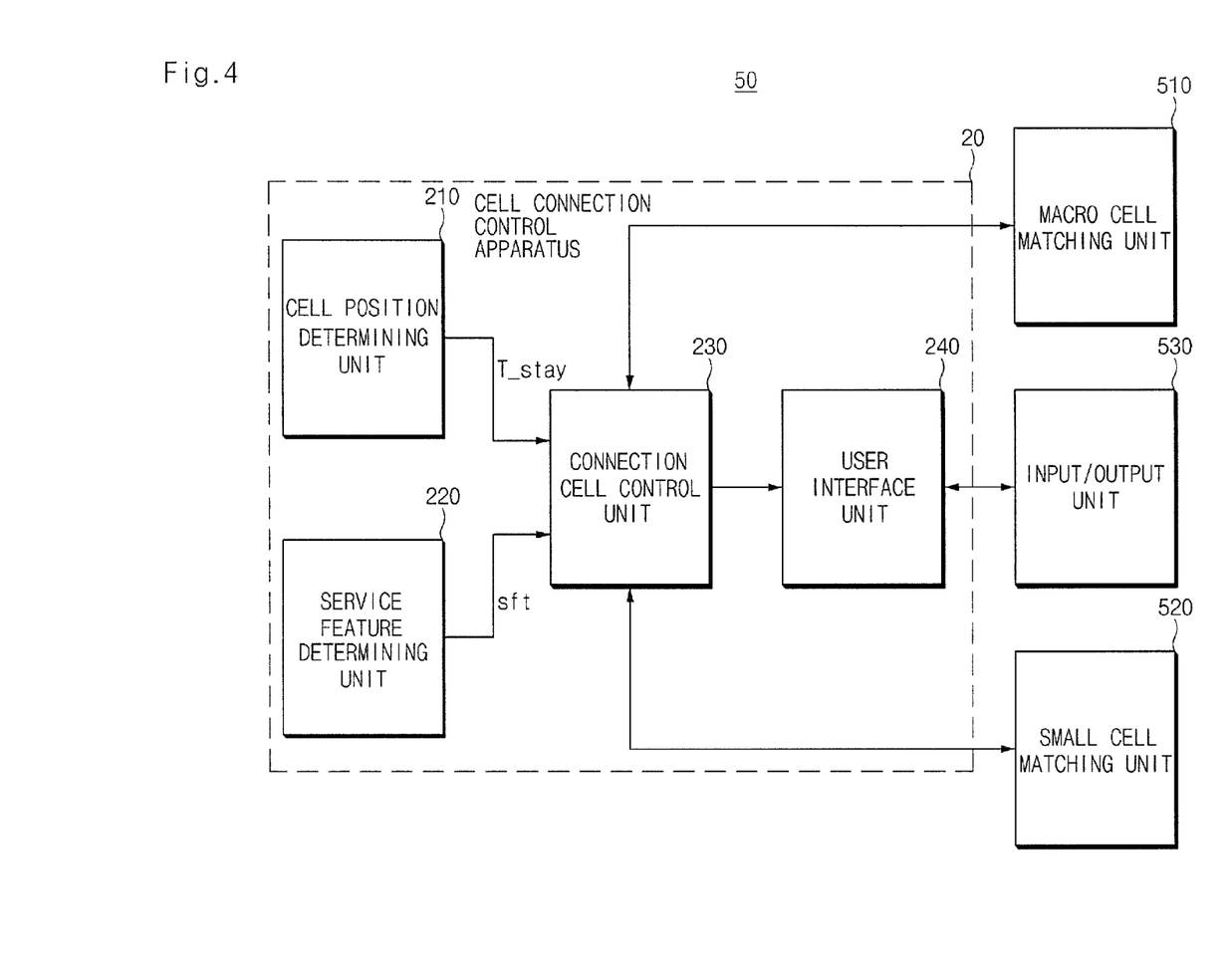
FIG. 4 is a block diagram illustrating a terminal including a terminal connection control apparatus according to an embodiment of the present invention.

FIG. 4 is a block diagram illustrating a terminal including a terminal connection control apparatus according to an embodiment of the present invention.

Referring to FIG. 4, a terminal 50 includes a terminal connection control apparatus 20, a macro cell matching unit 510, a small cell matching unit 520, and an input/output unit 530.

Like elements are denoted by like reference numerals so that detailed description thereof will be omitted.

As described above, the terminal connection control apparatus 20 controls a connection cell based on a position of a terminal (that is, a maintaining time T_stay in a specific cell) and a requested data speed (dsp).

The macro cell matching unit 510 and the small cell matching unit 520 are connected to the macro cell or the small cell in accordance with a cell connection signal from the connection cell control unit 230 to perform a matching operation. As described above, in this specification, the small cell and the micro cell are collectively referred to as a small cell so that the small cell matching unit 520 may perform connection and matching with the micro cell.

The input/output unit 530 may include an output unit such as a display or a speaker of the terminal and an input unit such as a touch pad or a key pad. The input/output unit 530 provides an input/output interface to the user to receive an input or provide an output.

An input signal through the input/output unit 530 is provided to the user interface unit 240 and an output which is provided from the user interface unit 240 may be provided to the user through the input/output unit 530.

As described above, the terminal connection control apparatus and the terminal connection control method according to the embodiments of the present invention control the connection of the terminal based on a time when the terminal stays in a specific cell and a data speed requested by the terminal, thereby efficiently managing the connection of the terminal in a network environment where the macro cell and the small cell are mixed.

The foregoing present invention is not limited to the foregoing embodiments and the accompanying drawings. It will be apparent to those skilled in the art that various substitutions, modifications and changes may be made without departing from the technical spirit of the present invention.

What is claimed is:

1. A terminal connection control apparatus, comprising:
a cell position determining unit which provides information on a cell position of a terminal and includes a cell position database which accumulatively stores information on a time when the terminal is located in a cell, the cell position database respectively storing the information on the time in regards to one or more cells including the cell;
a service feature determining unit which figures out a feature of a service including a data speed requested by the service which is provided in the terminal and information indicating whether to control a mobility based on an application program which is being executed in the terminal; and
a connection cell control unit which figures out cells to which the terminal is currently connectable and controls a connection cell to a small cell which satisfies the service feature among small cells to which the terminal is connectable, based on the cell position information and the service feature,
wherein the connection cell control unit, when the terminal is connected to a macro cell, if information indicating that the terminal is located in a small cell for a predetermined time or longer is received from the cell position determining unit, determines whether the terminal is appropriate for connection to the small cell to control the terminal to be connected to the small cell,
wherein the information indicating that the terminal is located in a small cell for a predetermined time or longer includes information indicating that a number of times when the terminal is located in the small cell for the predetermined time or longer is equal to or larger than a predetermined number of times from the cell position database.

2. The apparatus of claim 1, wherein the service feature includes a data speed requested by the terminal and whether to control a mobility for a service.

3. The apparatus of claim 2, wherein the connection cell control unit receives a data speed which is capable of being provided from a base station which controls a small cell to which the terminal is connectable.

4. The apparatus of claim 3, wherein the connection cell control unit determines that the terminal is appropriate for the connection to the small cell when the requested data speed is equal to or slower than the available data speed and the mobility for the service does not need to be controlled.

5. The apparatus of claim 1, wherein the connection cell control unit, when the terminal is being connected to the small cell, determines a handover condition to control the terminal to be connected to a macro cell or another small cell.

6. The apparatus of claim 1, further comprising:
a user interface unit which inputs the order of priority of macro cell or small cell connection.

7. The apparatus of claim 6, wherein the connection cell control unit controls the connection of the terminal based on the order of priority from the user interface unit.

8. A method for controlling connection of a terminal in a multilayered cell environment which is configured by a macro cell and a small cell overlapping the macro cell, the method comprising:
figuring out a cell in which the terminal is located by accumulatively storing a cell in which the terminal is located and a time when the terminal is located in the cell together;
figuring out a service feature including a data speed requested by a service which is provided in the terminal and information indicating whether to control a mobility; and
figuring out cells to which the terminal is currently connectable and controlling a connection cell of the terminal based on a cell position information, the service feature, and number of terminals connected to the connection cell,
wherein the service feature is figured out based on an application program which is being executed in the terminal,
wherein the controlling of a connection cell of the terminal includes:
determining, when the terminal is being connected to the macro cell, whether the terminal is located in the small cell for a predetermined time or longer; and
determining, when the terminal is located in the small cell for the predetermined time or longer, whether the terminal is appropriate for small cell connection based on the service feature,
wherein a case when the terminal is located in the small cell for the predetermined time or longer includes a case when a number of times when the terminal is located in the small cell for the predetermined time or longer is equal to or larger than a predetermined number of times.

9. The method of claim 8, wherein the determining whether the terminal is appropriate for small cell connection includes:
figuring out a small cell to which the terminal is connectable based on the cell position information; and
receiving a data speed which is capable of being provided from a base station which controls a small cell to which the terminal is connectable.

10. The method of claim 9, further comprising:
determining, when the requested data speed is equal to or slower than the available data speed and the mobility does not need to be controlled, that the terminal is appropriate for the connection to the small cell.

11. The method of claim 8, wherein the controlling of a connection cell of the terminal includes:
determining, when the terminal is being connected to the small cell, whether the terminal satisfies a handover condition.

12. The method of claim 8, further comprising:
receiving Information on the order of priority of connection from a user.

13. The method of claim 12, wherein the controlling of a connection cell of the terminal includes:
determining a connection cell of the terminal based on the information on the order of priority of connection.

14. The method of claim 8, wherein the figuring out of a speed of data requested by the terminal includes:

figuring out the requested data speed based on an application program which is being executed in the terminal.

15. A method for controlling connection of a terminal in a multilayered cell environment which is configured by a macro cell and a small cell overlapping the macro cell, the method comprising:

figuring out a cell in which the terminal is located;

figuring out a service feature including a data speed requested by a service which is provided in the terminal and information indicating whether to control a mobility; and controlling a connection cell of the terminal based on the cell position information and the service feature, wherein the controlling of a connection cell of the terminal includes;

determining, when the terminal is being connected to the macro cell, whether the terminal is located in the small cell for a predetermined time or longer; and determining, when the terminal is located in the small cell for the predetermined time or longer, whether the terminal is appropriate for small cell connection based on the service feature, and wherein a case when the terminal is located in the small cell for the predetermined time or longer includes a case when a number of times when the terminal is located in the small cell for the predetermined time or longer is equal to or larger than a predetermined number of times.

* * * * *